US011861378B2

(12) United States Patent
Rosenbaum et al.

(10) Patent No.: US 11,861,378 B2
(45) Date of Patent: Jan. 2, 2024

(54) VECTOR-SPACE REPRESENTATIONS OF GRAPHICAL USER INTERFACES

(71) Applicant: ASAPP, INC., New York, NY (US)

(72) Inventors: Clemens Georg Benedict Rosenbaum, New York, NY (US); Adrian Philip Botta, New York, NY (US); Agustín Ismael Montero, Ciudad Autónoma de Buenos Aires (AR)

(73) Assignee: ASAPP, INC., New York, NY (US)

( * ) Notice: Subject to any disclaimer, the term of this patent is extended or adjusted under 35 U.S.C. 154(b) by 501 days.

(21) Appl. No.: 16/805,927

(22) Filed: Mar. 2, 2020

(65) Prior Publication Data
US 2021/0271494 A1 Sep. 2, 2021

(51) Int. Cl.
*G06F 9/451* (2018.01)
*G06N 3/084* (2023.01)
*G06N 20/00* (2019.01)
*G06N 3/08* (2023.01)

(52) U.S. Cl.
CPC .............. *G06F 9/451* (2018.02); *G06N 3/08* (2013.01); *G06N 3/084* (2013.01); *G06N 20/00* (2019.01)

(58) Field of Classification Search
CPC ........ G06F 9/451; G06N 3/084; G06N 20/00; G06N 3/08
See application file for complete search history.

(56) References Cited

U.S. PATENT DOCUMENTS

| 8,538,989 B1* | 9/2013 | Datar ................... G06F 16/313 |
| | | 707/780 |
| 8,566,696 B1* | 10/2013 | Hamon ................ G06F 16/957 |
| | | 715/205 |
| 11,201,892 B1* | 12/2021 | Kashitsyn .......... H04L 63/1408 |
| 2013/0111327 A1* | 5/2013 | Tsutsui ............... G06F 16/9577 |
| | | 715/234 |
| 2015/0371142 A1* | 12/2015 | Jain ....................... G06N 5/048 |
| | | 706/52 |

(Continued)

OTHER PUBLICATIONS

Battaglia, et al., "Relational inductive biases, deep learning, and graph networks", arXiv:1806.01261v3 [cs.LG], https://arxiv.org/pdf/1806.01261.pdf (accessed on Apr. 8, 2020), Oct. 17, 2018, 40 pages.

(Continued)

*Primary Examiner* — Roberto Borja
(74) *Attorney, Agent, or Firm* — GTC Law Group PC & Affiliates

(57) ABSTRACT

A graphical user interface (GUI) page may be represented as GUI page encoding to facilitate processing of the GUI page in an application of GUI pages. A GUI page encoding may be computed by processing a GUI with a GUI page encoding model, and a GUI page encoding model may be trained by processing a training corpus of sequences of GUI pages. The training process may include obtaining first and second GUI pages from the training corpus, computing first and second GUI page encodings with the GUI page encoding model, computing a predicted GUI page encoding by processing the first GUI page encoding with a page predictor model, computing an error value be comparing the predicted GUI page encoding and the second GUI page encoding, and updating parameters of the GUI page encoding model by performing back propagation using the error value.

20 Claims, 14 Drawing Sheets

(56) References Cited

U.S. PATENT DOCUMENTS

| | | | |
|---|---|---|---|
| 2017/0116544 A1* | 4/2017 | Johnson | G06N 7/005 |
| 2019/0196932 A1* | 6/2019 | Adika | G06Q 30/0282 |
| 2019/0213354 A1* | 7/2019 | Bhowan | G06N 20/00 |
| 2020/0336506 A1* | 10/2020 | Levin | G06F 40/30 |
| 2021/0081467 A1* | 3/2021 | Chawla | G06F 16/958 |
| 2021/0209142 A1* | 7/2021 | Tagra | G06F 40/166 |
| 2021/0232928 A1* | 7/2021 | Farrahi Moghaddam | F15B 11/08 |

OTHER PUBLICATIONS

Beltramelli, "pix2code: Generating Code from a Graphical User Interface Screenshot", arXiv:1705.07962v2 [cs.LG], https://arxiv.org/pdf/1705.07962.pdf (accessed on Apr. 8, 2020), Sep. 19, 2017, 9 pages.

Bowman, et al., "A Fast Unified Model for Parsing and Sentence Understanding", arXiv:1603.06021v3 [cs.CL], https://arxiv.org/pdf/1603.06021.pdf (accessed on Apr. 8, 2020), Jul. 29, 2016, 11 pages.

Bruna, et al., "Spectral Networks and Deep Locally Connected Networks on Graphs", arXiv:1312.6203v3 [cs.LG], https://arxiv.org/pdf/1312.6203.pdf (accessed Apr. 8, 2020), May 21, 2014, 14 pages.

Cer, et al., "Universal Sentence Encoder", arXiv:1803.11175v2 [cs.CL], https://arxiv.org/pdf/1803.11175.pdf (accessed on Apr. 8, 2020), Apr. 12, 2018, 7 pages.

Choi, et al., "Learning to Compose Task-Specific Tree Structures", arXiv:1707.02786v4 [cs.CL], https://arxiv.org/pdf/1707.02786.pdf (accessed on Apr. 8, 2020), Nov. 21, 2017, 10 pages.

Dong, et al., "metapath2vec: Scalable Representation Learning for Heterogeneous Networks", KDD'17, Halifax, NS, Canada, https://ericdongyx.github.io/papers/KDD17-dong-chawla-swami-metapath2vec.pdf (accessed on Apr. 8, 2020), Aug. 13-17, 2017, pp. 135-144.

Ganea, et al., "Hyperbolic Entailment Cones for Learning Hierarchical Embeddings", arXiv:1804.01882v3 [cs.LG], https://arxiv.org/pdf/1804.01882.pdf (accessed on Apr. 8, 2020), Jun. 6, 2018, 13 pages.

Grover, et al., "node2vec: Scalable Feature Learning for Networks", KDD '16, San Francisco, CA, USA, https://cs.stanford.edu/~jure/pubs/node2vec-kdd16.pdf (accessed on Apr. 8, 2020), Aug. 13-17, 2016, 10 pages.

Kipf, et al., "Semi-Supervised Classification with Graph Convolutional Networks", arXiv:1609.02907v4 [cs.LG], https://arxiv.org/pdf/1609.02907_pdf (accessed on Apr. 8, 2020), Feb. 22, 2017, 14 pages.

Le, et al., "Inferring Concept Hierarchies from Text Corpora via Hyperbolic Embeddings", arXiv:1902.00913v1 [cs.CL], https://arxiv.org/pdf/1902.00913.pdf (accessed on Apr. 8, 2020), Feb. 3, 2019, 11 pages.

Li, et al., "Discriminative Deep RandomWalk for Network Classification", Proceedings of the 54th Annual Meeting of the Association for Computational Linguistics, Berlin, Germany, https://www.aclweb.org/anthology/P16-1095.pdf (accessed on Apr. 8, 2020), Aug. 7-12, 2016, pp. 1004-1013.

Mikolov, et al., "Efficient Estimation of Word Representations in Vector Space", arXiv:1301.3781v3 [cs.CL], https://arxiv.org/pdf/1301.3781.pdf (accessed on Apr. 8, 2020), Sep. 7, 2013, 12 pages.

Nickel, et al., "Learning Continuous Hierarchies in the Lorentz Model of Hyperbolic Geometry", arXiv:1806.03417v2 [cs.AI], https://arxiv.org/pdf/1806.03417.pdf (accessed on Apr. 8, 2020), Jul. 8, 2018, 10 pages.

Nickel, et al., "Poincaré Embeddings for Learning Hierarchical Representations", arXiv:1705.08039v2 [cs.AI], https://arxiv.org/pdf/1705.08039.pdf (accessed on Apr. 8, 2020), May 26, 2017, 10 pages.

Niepert, et al., "Learning Convolutional Neural Networks for Graphs", arXiv:1605.05273v4 [cs.LG], https://arxiv.org/pdf/1605.05273.pdf (accessed on Apr. 8, 2020), Jun. 8, 2016, 10 pages.

Pan, et al., "Tri-Party Deep Network Representation", Proceedings of the Twenty-Fifth International Joint Conference on Artificial Intelligence (IJCAI-16), https://www.ijcai.org/Proceedings/16/Papers/271.pdf (accessed on Apr. 8, 2020), Jul. 9-15, 2016, pp. 1895-1901.

Pennington, et al., "GloVe: Global Vectors for Word Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.

Perozzi, et al., "DeepWalk: Online Learning of Social Representations", arXiv:1403.6652v2 [cs.SI], https://arxiv.org/pdf/1403.6652.pdf (accessed on Apr. 8, 2020), Jun. 27, 2014, 10 pages.

Schlichtkrull, et al., "Modeling Relational Data with Graph Convolutional Networks", arXiv:1703.06103v4 [stat.ML], https://arxiv.org/pdf/1703.06103.pdf (accessed on Apr. 8, 2020), Oct. 26, 2017, 9 pages.

Socher, et al., "Parsing Natural Scenes and Natural Language with Recursive Neural Networks", Proceedings of the 28th International Conference on Machine Learning, Bellevue, WA, USA, https://nlp.stanford.edu/pubs/SocherLinNgManning_ICML2011.pdf (accessed on Apr. 8, 2020), 2011, 8 pages.

Tai, et al., "Improved Semantic Representations From Tree-Structured Long Short-Term Memory Networks", arXiv:1503.00075v3 [cs.CL], https://arxiv.org/pdf/1503.00075v3.pdf (accessed on Jan. 3, 2017), May 30, 2015, 11 pages.

Wang, et al., "Knowledge Graph Convolutional Networks for Recommender Systems", arXiv:1904.12575v1 [cs.IR], https://arxiv.org/pdf/1904.12575.pdf (accessed on Apr. 8, 2020), Mar. 18, 2019, 7 pages.

Yang, et al., "Revisiting Semi-Supervised Learning with Graph Embeddings", arXiv:1603.08861v2 [cs.LG], https://arxiv.org/pdf/1603.08861.pdf (accessed on Apr. 8, 2020), May 26, 2016, 9 pages.

Zhang, et al., "Learning from Collective Intelligence: Feature Learning Using Social Images and Tags", ACM Trans. Multimedia Comput. Commun. Appl. 13, 1, Article 1, https://dl.acm.org/doi/pdf/10.1145/2978656 (accessed on Apr. 8, 2020), Nov. 2016, 23 pages.

\* cited by examiner

```
<html>
<head>
...
</head>
<body>
    ...
    <form>
        <div class="row form-row">
            <div class="form-group">
                <div class="col-xs-12 col-sm-4">
                    <label class="control-label">Name:</label>
                </div>
                <div class="col-xs-12 col-sm-8">
                    <input name="name" type="text" value="John Doe">
                </div>
            </div>
        </div>
        <div class="row form-row">
            <div class="form-group">
                <div class="col-xs-12 col-sm-4">
                    <label class="control-label">Email address:</label>
                </div>
                <div class="col-xs-12 col-sm-8">
                    <input name="email" type="email" value="user@example.com">
                </div>
            </div>
        </div>
    </form>
    ...
</body>
</html>
```

VECTOR-SPACE REPRESENTATIONS OF GRAPHICAL USER INTERFACES

BACKGROUND

A graphical user interface, such as a web page of a website, may be represented in a variety of formats. For example, a web page may be represented using HTML (hypertext markup language) or XML (extensible markup language). While these representations of graphical user interfaces allow for presentation of the graphical user interfaces to a user, they may not be well suited for applications that process graphical user interfaces.

BRIEF DESCRIPTION OF THE FIGURES

The invention and the following detailed description of certain embodiments thereof may be understood by reference to the following figures:

FIG. 2 is an example of a portion of an HTML file for presenting a GUI page.

DETAILED DESCRIPTION

Graphical user interfaces (GUIs) are used in a wide variety of applications to present information to a user, and GUIs may be presented on a wide variety of devices, including but not limited to computer screens, tablets, smartphones, smart watches, and smart appliances. A device that presents a GUI may receive information or instructions for how to present or render that GUI on a display. For example, a device that presents a web page may receive the instructions in one or more files, such as HTML files, CSS (cascading stylesheets) files, or Javascript files. For another example, an Android device may receive the instructions in one or more files, such as XML files. Other devices may receive the information for presenting the GUI in another format, and the techniques described herein are not limited to any particular manner of instructing a device to present a GUI. Although the examples herein will use HTML as an example of instructions for presenting a GUI, the techniques described herein are not limited to HTML and web pages and may be applied with any format of instructions for presenting a GUI.

The techniques described herein relate to representing instructions (such as code, software, or scripts) for presenting a GUI page (e.g., an HTML file) as a vector in a vector space. Vector space representations have been successfully applied in other applications (e.g., word embeddings and sentence encodings), and accordingly a vector space representation of a GUI page may be used in applications of GUI pages. For example, to determine if two GUI pages have similar content, a distance may be computed between the vector space representation the two GUI pages.

As used herein, a GUI page may include any user interface that is presented to a user, such as a user interface presented by a device (e.g., a computer screen, monitor, tablet, or portable device) or is otherwise visible (e.g., projected onto a surface). A GUI page may be presented as a web page, may be presented by an application or "app", or may presented by any other appropriate means. A GUI page may also be a portion of a larger user interface, such as a window in a larger user interface or any other relevant portion of a larger user interface.

Figure 1A:
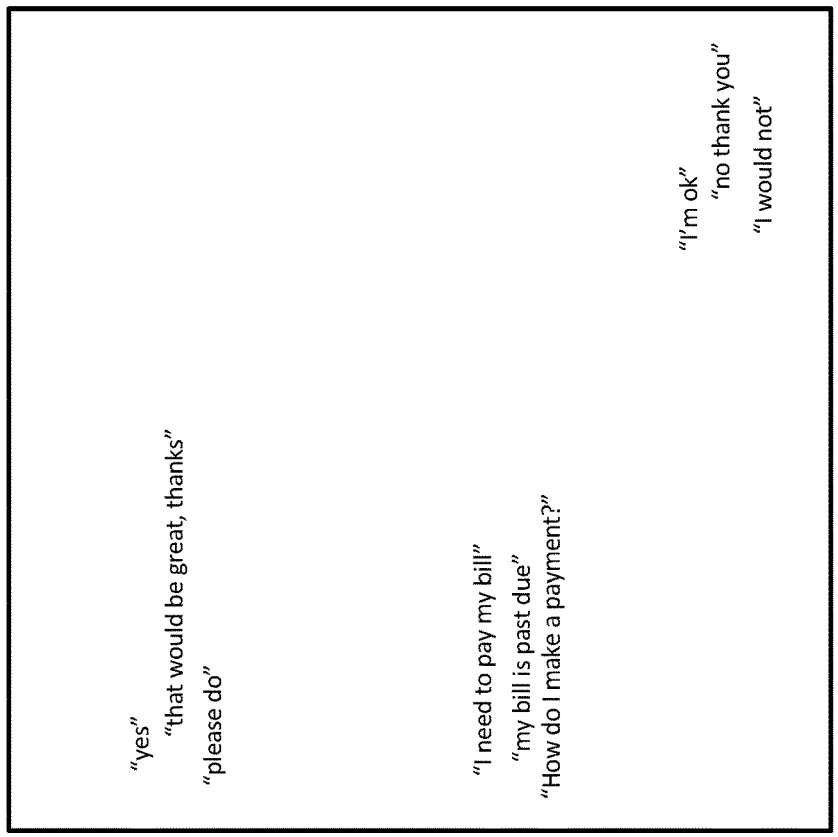
FIGS. 1A and 1B illustrate examples of word embeddings and sentence encodings.

FIG. 1A illustrates an example of a vector space representation of words or word embeddings. A word embedding is a vector in a vector space that represents the word but does so in a manner that preserves useful information about the meaning of the word. For example, the word embeddings may be constructed so that words with similar meanings or categories may be close to one another in the vector space. For example, the word embeddings for "cat" and "cats" may be close to each other because they have similar meanings, and the words "cat" and "dog" may be close to each other because they both relate to pets.

Figure 1B:
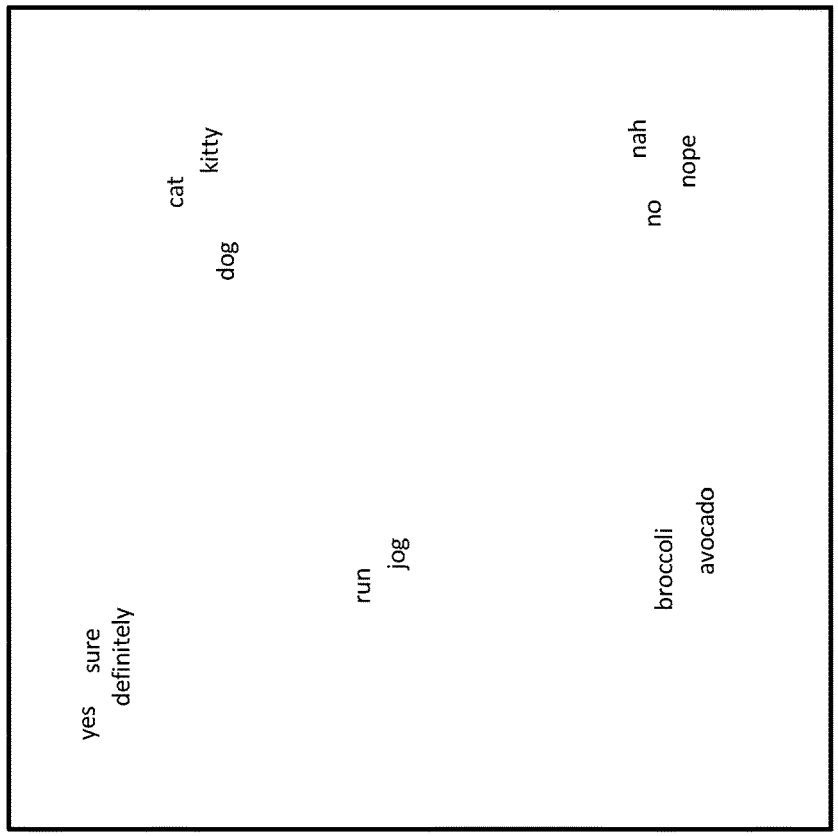

FIG. 1B illustrates an example of a vector space representation of sentences or sentence encodings. Similar to word embeddings, a sentence encoding is a vector in a vector space that represents the sentence but does so in a manner that preserves useful information about the meaning of the sentence. For example, the sentence encodings may be constructed so that sentences with similar meanings or categories may be close to one another in the vector space. For example, the sentence encodings for "yes" and "please do" may be close to each other because they have similar meanings.

The techniques described herein relate to computing vector space representations of GUI elements (e.g., HTML elements) and GUI pages (e.g., web pages). As an illustrative example, an example web page is now described.

FIG. 2 is an example of a portion of an HTML file for presenting a GUI page. An HTML file is made up of HTML elements that may be represented using a tree structure. The top or root of the tree structure is the <html> element. In this example, the <html> element has two child elements, the <head> element and the <body> element. The <head> and <body> elements may each have multiple child elements and so forth. For clarity of presentation, terminology relating to HTML elements will now be described.

An HTML element has a "tag" that indicates the type of HTML element. Examples of tags include html, head, body, div, form, p, and so forth. Some HTML elements may have an opening tag and a closing tag with other content (such as text or other HTML elements) between the opening tag and the closing tag. Some HTML elements may consist of a single tag, such as the <img> element for an image.

An HTML element may have one or more attributes where each attribute may be a name or a name/value pair. For example, the following HTML element
<label class="control-label">Name:</label>
has one attribute where the name of the attribute is "class" and the value of the attribute is "control-label". An HTML element may have more than one attribute.

An element may include text and/or one or more child elements between the opening tag and the closing tag. In this situation, the text generally corresponds to the element, while the child elements are separate elements even though they are represented within their parent element. For example, for the element
<p>Hello <span>World!</span><p>
The text "Hello" is part of the paragraph element while the span element and its contents correspond to a child element.

In some implementations, a DOM (document object model) representation of a GUI page may be used in addition to or instead of HTML. A DOM representation of a web page may include modifications that are not present in an HTML file received at a device. For example, with a single-page web app, Javascript may modify the DOM without receiving HTML corresponding to those changes. Where HTML is used in examples described herein, it is understood that a DOM representation may be based on an HTML code, and the DOM representation may be used in addition to or instead of the HTML representation.

For other kinds of GUI pages, the instructions for presenting the GUI may have similarities with the HTML instructions described above but may also have differences. For example, XML instructions may include additional features, such as one or namespaces that are associated with elements or attributes.

GUI Element Embeddings

A GUI element embedding is a vector in a vector space that represents a GUI element. The GUI element embedding may have similar properties to word embeddings and may be used for applications of GUI pages. For example, the similarity of two GUI elements may be determined by computing a distance between the GUI element embeddings of the two GUI elements. Techniques for computing GUI element embeddings are now described.

Figure 3:
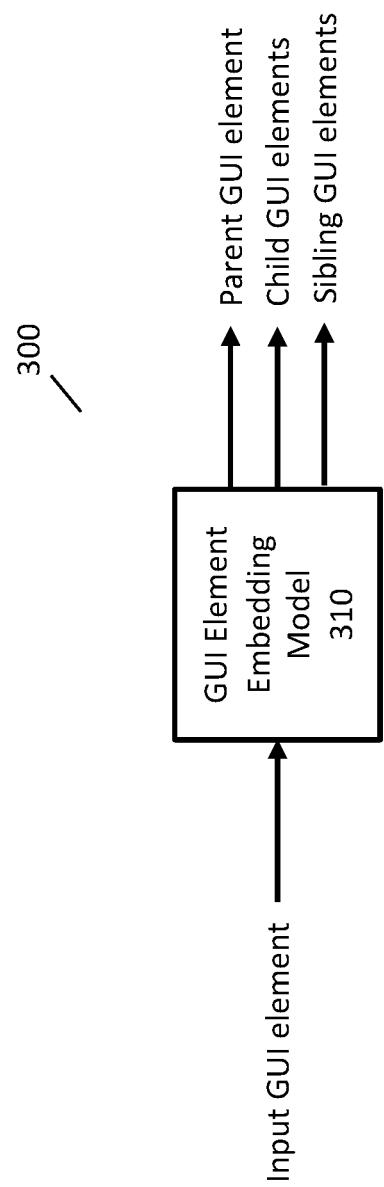
FIG. 3 is an example system for training GUI element embeddings from a training corpus of GUI pages.

FIG. 3 is an example system 300 for training GUI element embeddings from a training corpus of GUI pages. GUI element embedding model 310 may be trained by processing a corpus of GUI pages. The output of the training process may include GUI element embeddings for individual GUI elements seen in the training corpus and possibly an additional out-of-vocabulary (OOV) GUI element embedding for rarely seen GUI elements. For example, the training corpus may be a corpus of web pages, and the training process may determine HTML element embeddings for individual HTML elements in the training corpus of web pages.

GUI elements may include any appropriate elements such as text, boxes, hidden elements, drop-down menus, a span of text, tables, and the like. In some instances, GUI elements may be one or more individual HTML tags or a group of HTML tags. In some instances, a GUI element may include one or more HTML tags and any content that is encapsulated by the tags. In some embodiments, each of a HTML tag, attributes of a tag, and the content of a tag may each be treated as different GUI elements.

GUI element embedding model 310 may include any appropriate mathematical model, such as a neural network (e.g., a multi-layer perceptron). GUI element embedding model 310 may be trained to process a representation of an input GUI element (e.g., one or more one-hot vectors) and predict representations of neighboring GUI elements, such as the parent GUI element of the input GUI element, a sum of representations of child elements of the input GUI element, and a sum of representations of sibling GUI elements of the input GUI element. Other variations are possible as described in greater detail below.

Figure 4:
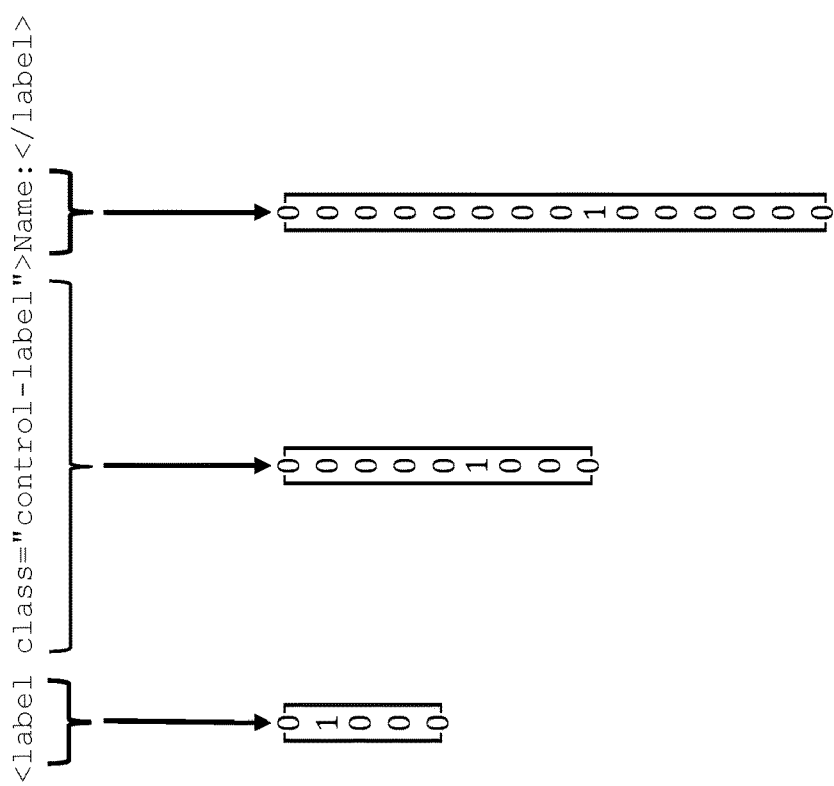
FIG. 4 illustrates an example representation of a GUI element that may be processed to train GUI element embeddings.

FIG. 4 illustrates an example representation of a GUI element that may be processed to train GUI element embeddings. In some implementations, a GUI element may be represented as one or more one-hot vectors. A one-hot vector is a vector that has a value of 1 in one position and a value of 0 in all of the other positions. The length of the one-hot vector may correspond to the number of possible values (with a possible additional value to represent out-of-vocabulary values). For example, if there are 8 possible values, then the values may be represented with one-hot vectors of length 8. A GUI element may also be represented using a one-cold vector that has a value of 0 in one position and a value of 1 in all of the other positions (one-hot and one-cold vectors may be used interchangeably for the techniques described herein).

In some implementations, a GUI element may be represented using a single one-hot vector. For example, the number of unique GUI elements may be determined, and one-hot vectors of that length may be used to represent the GUI elements.

In some implementations, a GUI element may be represented using more than one one-hot vector. For example, in FIG. 4, a GUI element may be represented using a combination of three one-hot vectors. In FIG. 4, the possible GUI element tags may be represented with a first one-hot vector. The length of a one-hot vector may be based on or related to the total number of possible different values or instances the vector may be used to represent. To represent N possible values for a GUI element, a one-hot vector may have a length of at least N. For example, if the number of possible tags is 110, then a one-hot vector of at least length 110 may be used to represent all the possible tags.

In FIG. 4, the possible element attributes may be represented using a second one-hot vector. For example, the element's attributes may be concatenated to form a string that is then used to generate the one-hot vector. In some implementations, other techniques may be implemented to remove differences that are not relevant to the GUI element. For example, the element attributes may be sorted by name. In some implementations, each attribute of an HTML element may be represented as a one-hot vector, and the combination of all the attributes of the element may be represented as a sum of the one-hot vectors for individual attributes. The number of possible element attributes may be larger than the number of possible tags, and thus a one-hot vector for representing attributes may be longer than the one-hot vector for tags.

In FIG. 4, the possible element text may be represented using a third one-hot vector. In some implementations, one-hot vectors may be created for the element text where the length of the one-hot vector is equal to the number of unique text strings in GUI elements. The number of possible text strings in GUI elements may be larger than the number of possible element attributes, and thus a one-hot vector for GUI element text may be longer than the one-hot vector for GUI element attributes. In some implementations, the GUI element text may be represented as a sum of one-hot vectors of individual words or a bag of words.

In some implementations, the text of GUI elements may be further processed before determining the one-hot vectors. The corpus of GUI elements being used to train GUI element embeddings may include data from real GUIs (e.g., websites) and thus may contain personal information, such as personally identifiable information, or other sensitive information, such as credit card numbers and social security numbers. To reduce risks associated with processing personal information, the text of GUI elements may be processed with a cryptographic hash function to conceal or prevent disclosure of the sensitive information. The computed hash values may be used in place of the original GUI element text. In some implementations, all GUI element text may be processed or hashed before being used to determine one-hot vectors regardless of whether the GUI element text actually contains personal or sensitive information. Any appropriate modification or hash function may be used, such as secure hash algorithms (SHA) or digital signature algorithms (DSA).

In some implementations, other portions of a GUI element may also hashed before determining a one-hot vector. For example, an attribute value of a GUI element may include personal or sensitive information, and the attribute values may also be hashed before determining one-hot vectors for the attributes.

A GUI element may accordingly be represented as a single one-hot vector, a combination of one-hot vectors (such as the concatenation of the three one-hot vectors illustrated in FIG. 4), or as a combination of sums of one-hot vectors (e.g., where GUI element text is represented as a bag of words). For clarity of presentation, where processing described herein relates to processing a one-hot representation, that processing may also include processing any combination of one-hot vectors described herein, such as the concatenation of one-hot vectors of FIG. 4 or the concatenation of sums of one-hot vectors.

In some implementations, a single representation may be used to represent multiple, related GUI elements. For example, a GUI element may have a large number of child elements or sibling elements (e.g., hundreds or thousands) and it may not be feasible to process representations of all such elements individually. The single representation of multiple GUI elements may be any appropriate combination, such as a sum of the representations of the individual elements (e.g., one-hot representations). For clarity of presentation, where processing described herein relates to processing a one-hot representation, that processing may also include processing a combination of one-hot representations, such as the sum of one-hot representations of related GUI elements.

Combining the preceding paragraphs, where processing described herein relates to processing a one-hot representation, the one-hot representation may include any of the following: a one-hot vector (a vector with 1 at one positions and 0's at other positions), a concatenation of two or more one-hot vectors, a sum of two or more one-hot vectors, a sum of two or more vectors where each vector in the sum is a one-hot representation of a GUI element, or any combination of the foregoing.

In some implementations, additional information may be used in computing a GUI element embedding, such as the position of the GUI element in the GUI page or information about parent elements of the GUI element. In some implementations, a one-hot representation of a GUI element may include the depth or distance of the GUI element from the root element of the GUI page, such as by representing the depth as a one-hot vector (e.g., the depth for a first GUI element may be determined from the number of GUI elements between the first GUI element and the root GUI element of a GUI element tree). In some implementations, a one-hot representation of a GUI element may include the lateral position or distance from the left-most element at the same depth, such as by representing the lateral position as a one-hot vector. In some implementations, a one-hot representation of a GUI element may include information about one or more ancestor elements (e.g., parent and grandparent elements), such as the tags of the ancestor elements represented as one-hot vectors or as a sum of one-hot vectors.

Figure 5:
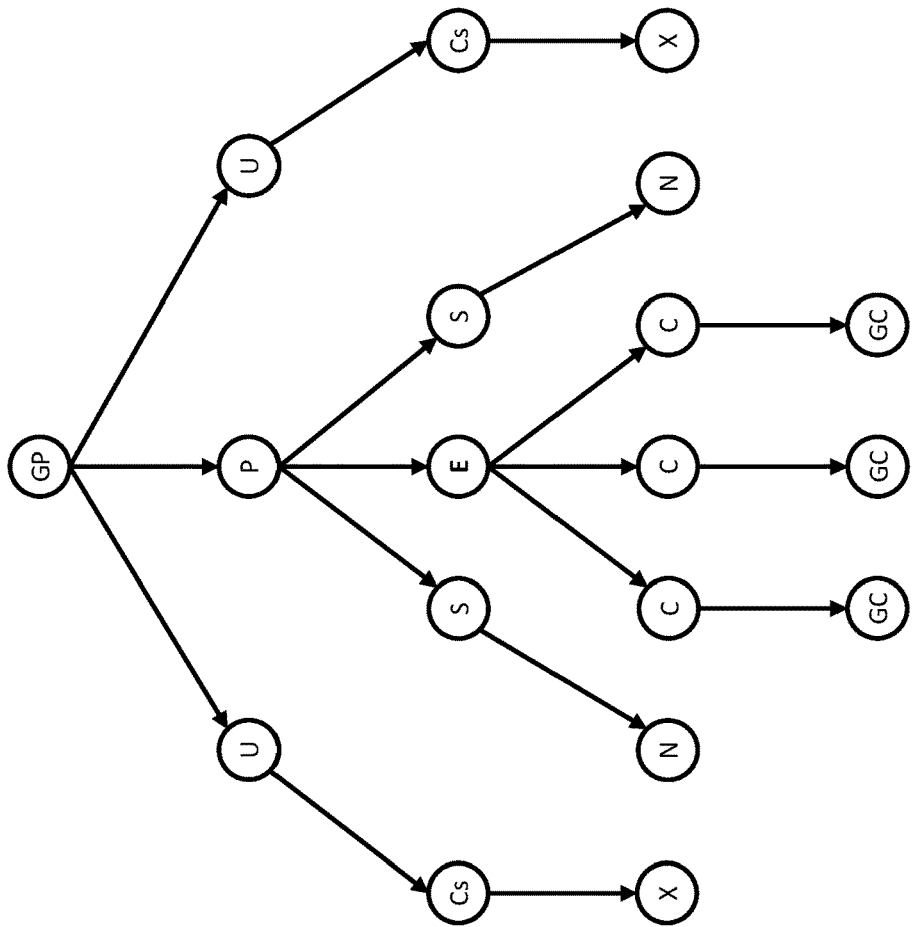
FIG. 5 illustrates example relationships between GUI elements.

FIG. 5 illustrates example relationships between GUI elements. In FIG. 5, a starting or current element is indicated by E. The element has a parent element P, a grandparent element GP, three child elements C, and three grandchild elements GC. In addition, element E has two sibling elements S, two uncle elements U, two nephew elements N, two cousin elements Cs, and two cousin elements once-removed X.

The GUI element embedding model 310 of FIG. 3 may be generalized to process any one-hot representation of an input GUI element (or a combination of GUI elements) and predict one or more one-hot representations of neighboring GUI elements. The following are non-limiting examples of generalizations of GUI element embedding model 310:

(i) a model that processes a one-hot representation of an input element to predict a one-hot representation of a single parent element, a one-hot representation of a single sibling element (e.g., a randomly selected sibling), and a one-hot representation of a single child element (e.g., a randomly selected child);

(ii) a model that processes a one-hot representation of an input element to predict a one-hot representation of a single parent element, a one-hot representation of all child elements, and a one-hot representation of all sibling elements;

(iii) a model that processes a one-hot representation of an input element to predict a one-hot representation of a parent element and all grandparent elements, a one-hot representation of all child elements and grandchild elements, and a one-hot representation of all sibling elements and all cousin elements;

(iv) a model that processes a one-hot representation of an input element to predict a one-hot representation of a combination of a parent element, all child elements, and all sibling elements; and (v) a model that processes a one-hot representation of a combination of an input element and all siblings of the input element to predict a one-hot representation of a parent element, a one-hot representation of all child elements of the input element, and a one-hot representation of all grandchild elements of the input element.

Figure 6:
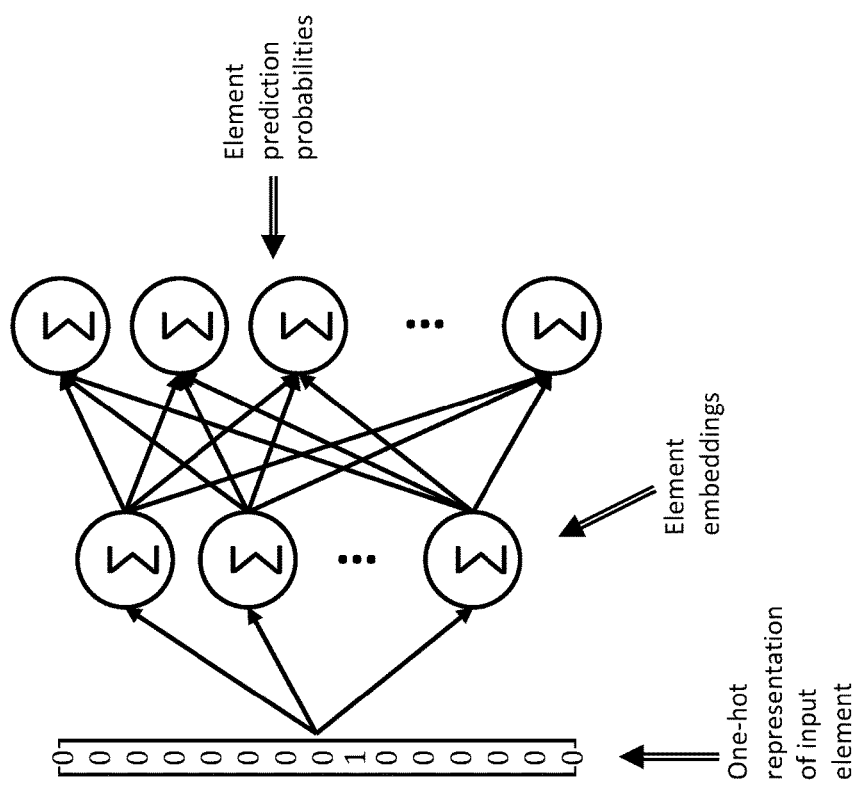
FIG. 6 is an example architecture of a mathematical model for computing GUI element embeddings.

FIG. 6 is an example architecture of a mathematical model for GUI element embedding model 310 to compute GUI element embeddings. In the example of FIG. 6, the mathematical model is a neural network that includes a multi-layer perceptron. In FIG. 6, the input to the neural network is a one-hot representation of an input GUI element, such as any of the one-hot representations described herein.

The one-hot representation is processed by a first linear layer to compute a GUI element embedding. The GUI element embedding is then processed by a second linear layer to predict a one-hot representation of a neighboring GUI element, such as a parent element, a sum of child elements, or a sum of sibling elements.

Other layers may be added to predict other neighboring elements. For example, the second layer may be used to predict a one-hot representation of a parent element. A third layer (parallel to the second layer) may be added that processes the GUI element embedding to predict a one-hot representation of a combination of child elements. A fourth layer (also parallel to the second layer) may be added that processes the GUI element embedding to predict a one-hot representation of a combination of sibling elements, and so forth.

Figure 7:
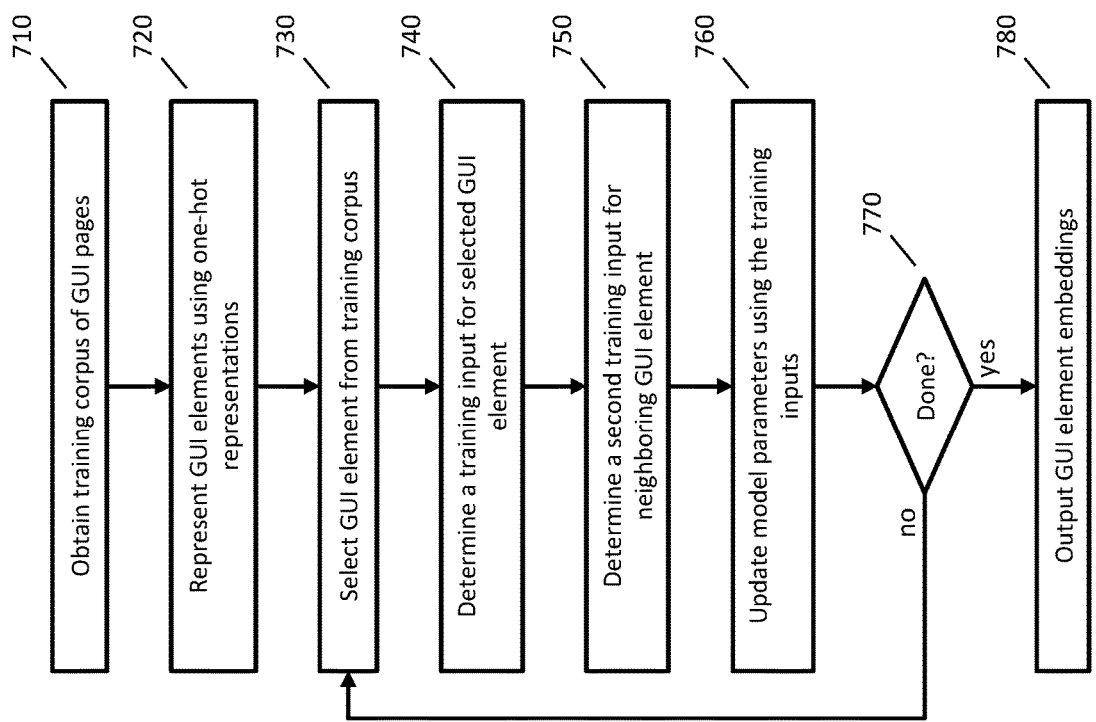
FIG. 7 is a flowchart of an example method for training a mathematical model for computing GUI element embeddings.

FIG. 7 is a flowchart of an example method for training a mathematical model for computing GUI element embeddings. In FIG. 7 and other flowcharts herein, the ordering of steps is a non-limiting example, not all steps are required, and steps may be combined or divided. The methods described by any flowcharts described herein may be implemented by any of the computers or systems described herein.

At step 710, a training corpus of GUI pages is obtained. Any appropriate training corpus may be used. For example, in some implementations, software may be used to record sequences of GUI pages as users of a GUI (e.g., users of a website) navigate through different pages of the GUI. Other initialization steps may be performed as well, such as initializing parameters of a GUI element embedding model with random values.

At step 720, one-hot representations are computed for GUI elements of the training corpus. In some implementations, a one-hot representation may be computed for all of the GUI elements in the corpus, and in some implementations, a one-hot representation may be computed for a subset of the GUI elements in the training corpus. The one-hot representations may include any of the one-hot representations described herein.

At steps 730 to 770, the training process iterates over the training corpus to process individual GUI elements in the training corpus. For clarity of presentation, the training process is described as iterating over a single GUI element at a time, but in some implementations, the training process may iterate over batches of GUI elements.

At step 730, a GUI element is selected. The GUI element may be selected using any appropriate techniques, such as random selection or sequentially iterating over GUI elements in the training corpus.

At step 740, a training input is determined for the selected GUI element. The training input may include any of the one-hot representations described herein.

At step 750, a second training input is determined for a neighboring GUI element of the selected GUI element. The neighboring element may be a direct neighbor (such as a parent or child) or may be a more distant neighbor (such as an uncle or a grandparent). The second training input may include any of the one-hot representations described herein.

In some implementations, the second training input for a neighboring element may be for a group of neighboring elements, such as all children of the selected element, all siblings of the selected element, or any other group of neighboring elements. The second training input for a group of neighboring element may be any combination of one-hot representations of the GUI elements in the group, such as a sum of the one-hot representations.

In some implementations, additional training inputs may be used. For example, a third training input may be determined that corresponds to a second neighboring element or a second group of neighboring elements.

At step 760, parameters of the model are updated using the training inputs. The model parameters may be updated using any appropriate techniques.

In some implementations, such as when the GUI element embedding model includes a neural network, forward propagation may be performed using the training input for the selected GUI element to compute a model output. An error value may be determined using the model output and the second training input for the neighboring GUI element (and possibly other training inputs for other neighboring GUI elements). Back propagation may then be performed to update the model parameters. In some implementations, the error value may be computed using a cross entropy loss or a squared error loss.

At step 770, it is determined if the training process is complete. If the training process is not complete, then processing continues to step 730 where another GUI element is selected. If the training process is complete, then processing continues to step 780. Any appropriate techniques may be used to determine if the training process is complete. For example, training may be complete after a fixed number of iterations or after a convergence parameter reaches a desired threshold.

At step 780, the trained GUI element embeddings are output. The GUI element embeddings may be obtained from the model using any appropriate techniques. For example, where the GUI element embedding model includes a neural network, such as a multi-layer perceptron, the GUI element embeddings may be the intermediate activation obtained at the output of the first fully connected layer.

The GUI element embeddings may then be used for any applications relating to processing GUI pages. In some implementations, the GUI element embeddings may be used to compute GUI page encodings as described below.

GUI Page Encodings

A GUI page encoding is a vector in a vector space that represents a GUI page. The GUI page encoding may have similar properties to sentence encodings and may be used for applications of GUI pages. For example, the similarity of two GUI pages may be determined by computing a distance between the GUI page encodings of the two GUI pages. Techniques for computing GUI page encodings are now described.

When computing GUI element embeddings, as described above, it may be possible to compute a GUI element embedding in advance for each possible GUI element (including a possible OOV GUI element embedding for less common GUI elements). When computing GUI page encodings for GUI pages, it may be preferred to compute the GUI page encoding for each GUI page as needed since there may be greater variability in GUI pages (such as when a website presents information about a large number of products, users, customers, or employees). Accordingly, a mathematical model may be trained that computes a GUI page encoding from a GUI page by processing the GUI elements of the GUI page. This mathematical model may be referred to as a GUI page encoding model.

An implementation of a GUI page encoding model may process a representation of GUI elements of a GUI page to compute a vector that represents the GUI page in a vector space. A GUI page encoding model may process any appropriate representation of GUI elements, such as GUI element embeddings or one-hot representations. Now described are example implementations of a GUI page encoding model.

Figure 8:
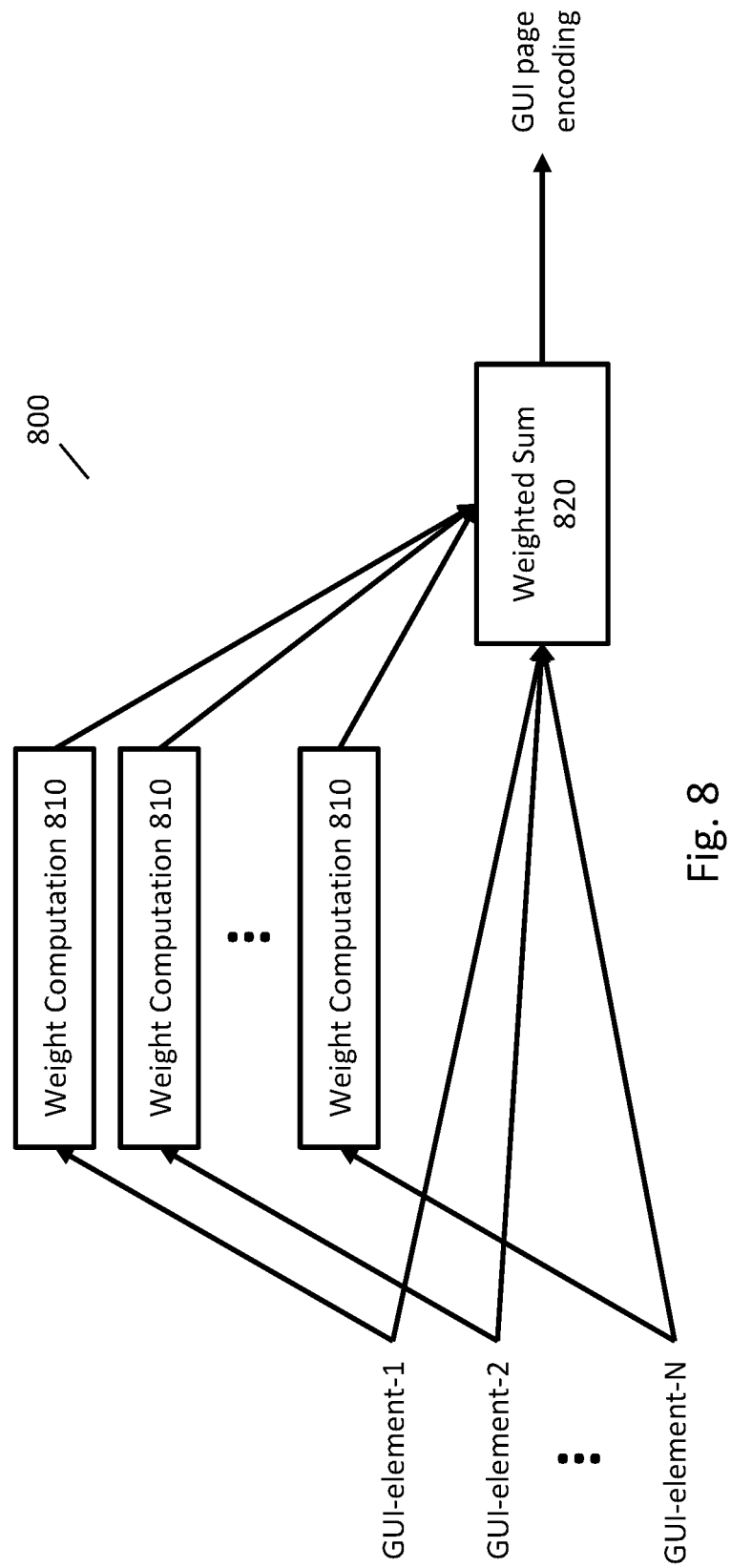
FIG. 8 is an example system for computing a GUI page encoding as a weighted sum of GUI element representations.

In some implementations, a GUI page encoding model may compute a weighted sum of GUI element representations of the GUI page. FIG. 8 is an example system 800 for computing a GUI page encoding as a weighted sum of GUI element representations. In FIG. 8, GUI-element-1, GUI-element-2, to GUI-element-N correspond to GUI element representations of the GUI page.

In FIG. 8, weight computation component 810 computes a weight from a GUI element representation. Weight computation component 810 may use any appropriate techniques to compute the weights. In some implementations, weight computation component 810 may compute the weights using a neural network. For example, a neural network may process a GUI element representation with a multi-layer perceptron to compute the weight for the GUI element. The neural network may be trained to compute larger weights for more important GUI elements (e.g., elements that relate to the purpose of the GUI page) and compute smaller weights for less important GUI elements (e.g., elements that appear on many pages, such as elements in the header or footer of the GUI page). Weighted sum computation component 820 may then compute the GUI page encoding as a weighted sum of the GUI element representations using any appropriate techniques.

In some implementations, a weighted sum of GUI element representations may also incorporate information about the position of the GUI element in the GUI page (where the GUI element representation does not already include position information). To include information about the position of a GUI element, the representation of a GUI element may be combined with other information that indicates the position of the element in the GUI page. For example, a GUI element representation may be combined with another vector that indicates the position of the GUI element by concatenating them together. The combined vector may be used directly or projected into a smaller vector space, such as by processing the combined vector with a neural network that outputs a vector with a shorter length. Where the combined vector is projected into a smaller vector space, the projection may be learned as part of training task, such as any of the training tasks described herein.

Any appropriate position information may be used, such as any of the following: a one-hot vector indicating the depth or distance of the element from the root element; a one-hot vector indicating a lateral position or distance from the left-most element at the same depth; or a representation of the parent GUI element (since the position of all GUI elements can be determined from combinations of GUI elements and their parents).

Any other appropriate techniques may also be used to combine a GUI element representation with position information. Position information may be absolute (e.g., relative to a root of a GUI element tree) or may be relative to another GUI element. For example, techniques similar to frequency modulation may be used to modify a GUI element representation to include position information. For another example, the position of a GUI element may be encoded using prime number factorization.

In some implementations, a GUI page encoding model may be adapted to the hierarchical relationship of GUI elements in a GUI page. For example, a GUI page encoding model may process all the GUI element of a GUI page in a specified order, such as depth first (pre-order, in-order, post-order, or any other order) traversal or a breadth first traversal. A mathematical model, such as a neural network may sequentially process the representations of each node in the specified order to output a final value to represent the GUI page.

Figure 9:
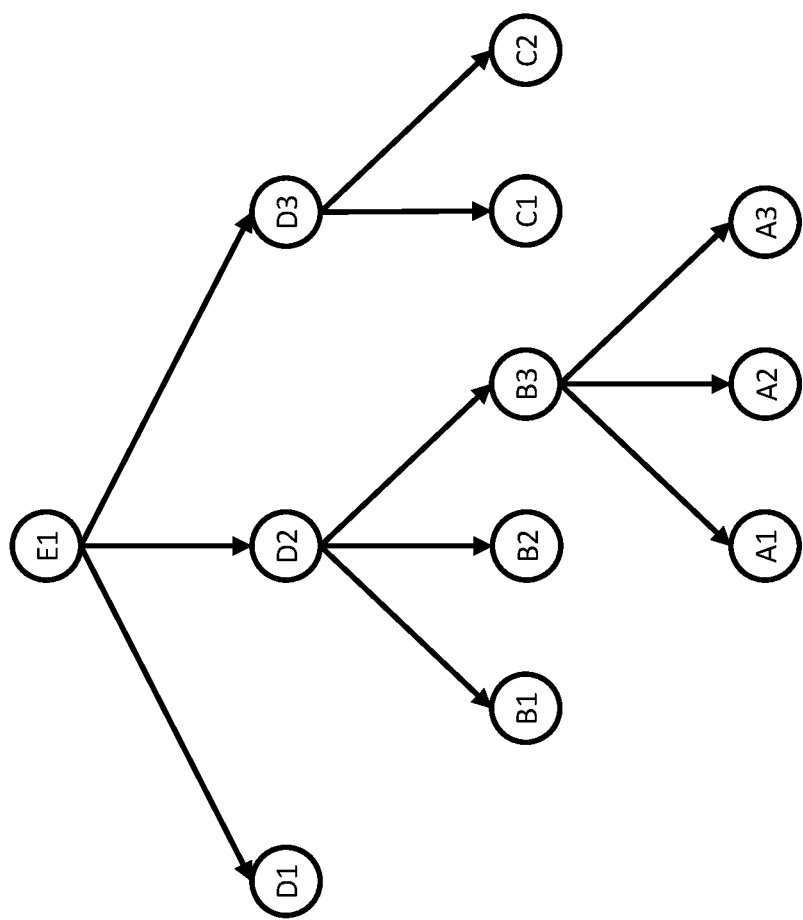
FIG. 9 is an example tree of GUI elements.

In some implementations, a tree of GUI elements may be processed using a depth-first post order traversal. An initial representation of each node may be the corresponding GUI element representation. Processing may start at leaves of subtrees of the GUI page, and the representations may be updated as processing proceeds up the tree. For illustration, FIG. 9 is an example tree of GUI elements.

The representations of nodes A1, A2, and A3 may be processed with a mathematical model to compute a combined representation of these nodes that is referred to as A*. The A* representation may then be combined with the representation of node B3 to compute a combined representation of the subtree under node B3 that is denoted as B3@. Afterwards, the representations of nodes B1 and B2 and the subtree B3@ may be processed with the mathematical model to compute a combined representation of these nodes and the nodes underneath them and that is referred to as B*. The B* representation may be combined with the representation of node D2 to compute a combined representation of the subtree under D2 that is denoted as D2@. This process may be continued for the remaining nodes of the tree to compute a representation E1@ that represents the entire tree of nodes.

Any appropriate mathematical model may be used to process the nodes of the tree. In some implementations, a recurrent neural network may be used to process the representations of each set of sibling elements (including subtree representations corresponding to a node). For example, a recurrent neural network may sequentially process A1, A2, and A3 to compute A*. Similarly, the recurrent neural network may sequentially process B1, B2, and B3@ to compute B*.

Any appropriate techniques may be used to combine the representation of sibling nodes (e.g., A*) with their parent node (e.g., B3). In some implementations, the representation of the sibling nodes may be added to the representation of the parent node. In some implementations, the representation of the sibling nodes may be concatenated with the representation of the parent node, and nodes without children may be concatenated with an empty (or some other) vector. For example, B3 may be concatenated with A* and each of B1 and B2 may be concatenated with an empty vector.

The above examples of GUI page encoding models include parameters that may need to be learned or trained to improve the performance of the resulting GUI page encodings. Now described are example techniques for training the parameters of a GUI page encoding model.

Figure 10A:
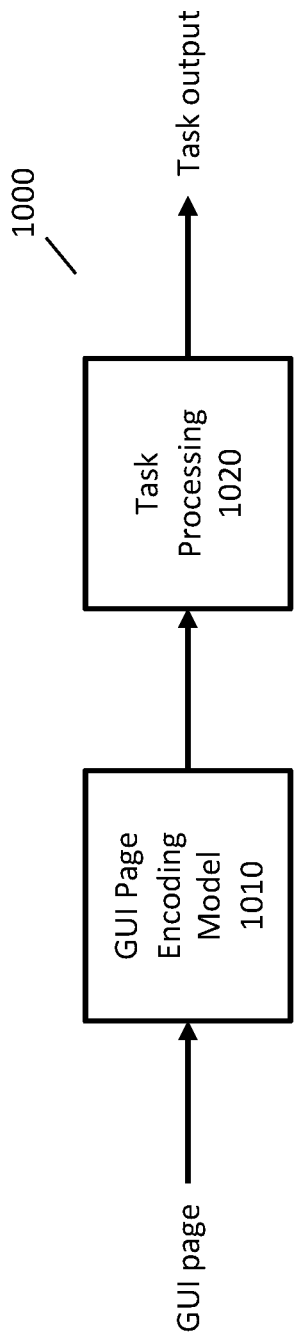
FIG. 10A is an example system for training a GUI page encoding model while performing a task.
Figure 10B:
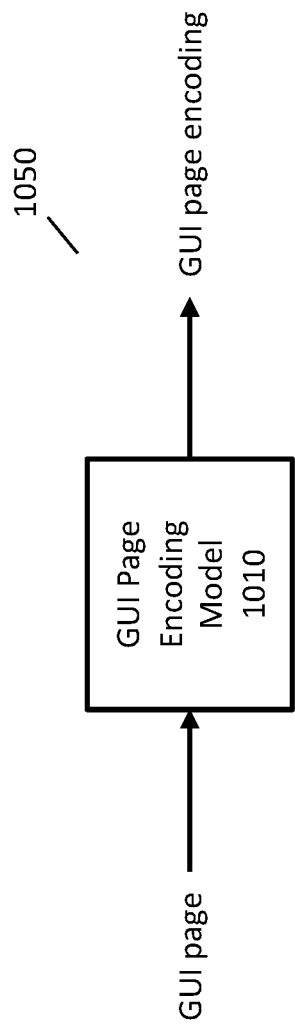
FIG. 10B is an example system for using a GUI page encoding model to compute a GUI page encoding from a GUI page.

FIG. 10A is an example system 1000 for training a GUI page encoding model while performing a task. FIG. 10B is an example system 1050 for using the trained GUI page encoding model to compute a GUI page encoding from a GUI page.

In FIGS. 10A and 10B, GUI page encoding model 1010 processes GUI element representations of a GUI page to compute a GUI page encoding. In FIG. 10A, GUI page encoding model 1010 is trained in the context of performing another task. Processing related to the task may be implemented by task processing component 1020 that computes a task output. Any appropriate task may be used to train GUI page encoding model 1010. For example, the task output may be the sentiment of the GUI page; people, places, or things mentioned in the GUI page; or whether the GUI page includes personal, sensitive, or confidential information.

In some implementations the task may involve supervised training of a task model for performing the task, where the task model is trained simultaneously with GUI page encoding model 1010. The training data for training the task model may include a corpus of GUI pages where GUI pages of the corpus are associated with one or more labels. For example, the labels may include any of the following: a sentiment of the GUI page (e.g., if the GUI page includes a review of a product or service, whether the review is positive, neutral, or negative); people, places, or things mentioned in the GUI page; or whether the GUI page includes personal, sensitive, or confidential information.

Figure 11:
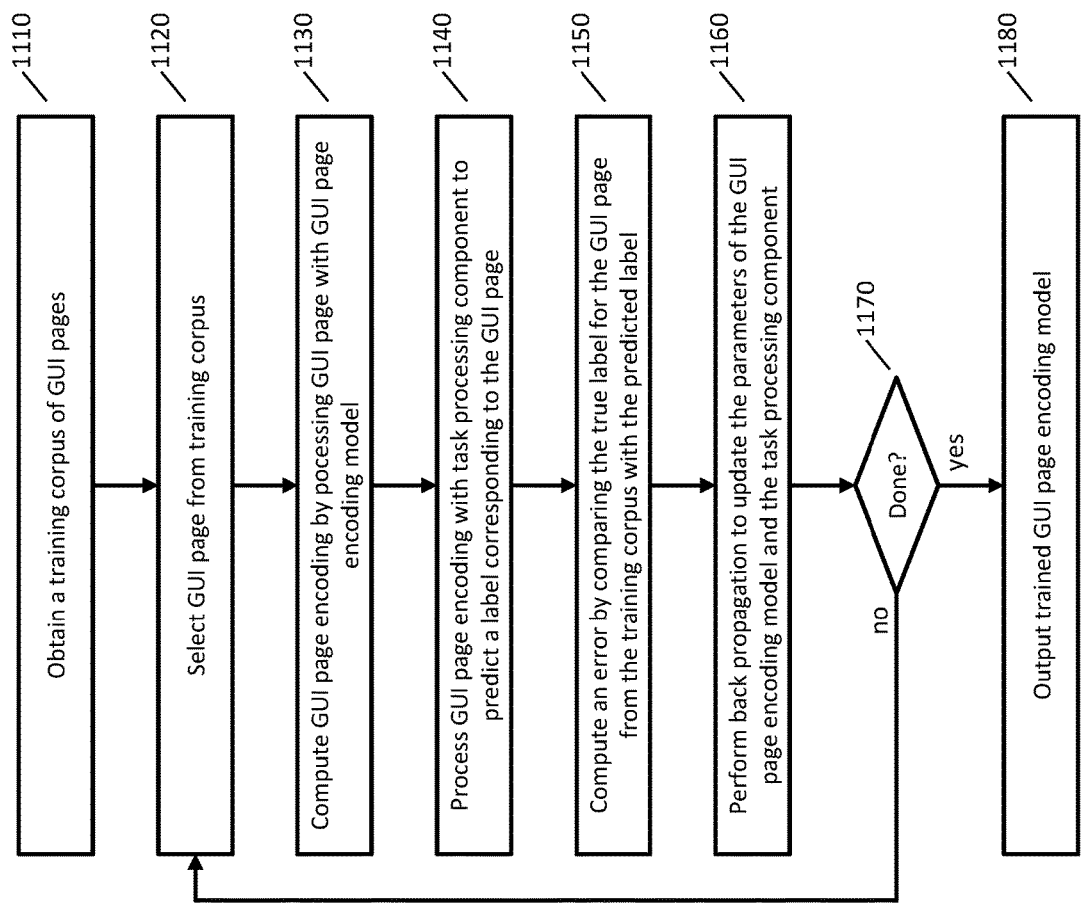
FIG. 11 is a flowchart of an example method for training a GUI page encoding model in the context of performing a task.

FIG. 11 is a flowchart of an example method for training a GUI page encoding model in the context of performing a task.

At step 1110, a training corpus of GUI pages is obtained where GUI pages may be associated with one or more labels. The training corpus may be obtained in any appropriate manner, such as recording use of a GUI (e.g., through specialized software) or by using software to automatically navigate a GUI. Any appropriate labels may be used, such as any of the labels described herein. Other initialization steps may be performed as well, such as initializing the parameters of the GUI page encoding model and/or other models with random values.

At steps 1120 to 1160, the training process iterates over the training corpus to process individual GUI pages in the training corpus. For clarity of presentation, the training process is described by iterating over a single GUI page at a time, but in some implementations, the training process may iterate over batches of GUI pages.

At step 1120, a GUI page is selected. The GUI page may be selected using any appropriate techniques, such as random selection or sequentially iterating over GUI pages in the training corpus.

At step 1130, a GUI page encoding is computed by processing GUI element representations of the of GUI page with the GUI page encoding model. Any appropriate techniques may be used to compute the GUI page encoding, such as any of the techniques described herein.

At step 1140, the GUI page encoding is processed by a task processing component to predict one or more labels that are associated with the GUI page. Any appropriate task and task processing component may be used, such as any of the tasks described herein. The task processing component may include any appropriate mathematical model, such as a neural network (e.g., multi-layer perceptron, convolutional neural network, or recurrent neural network) or a support vector machine.

At step 1150, an error value is computed for the prediction by comparing the true label for the GUI page from the training corpus with the predicted label. Any appropriate techniques may be used to compute the error value. In some implementations, the error value may be computed as a cross entropy loss or a squared error loss. In some implementations, the error value may be zero if the predicted label is equal to the true label and a non-zero value otherwise. In some implementations, the error value may be a function of the predicted label and the true label, such as a distance between them.

At step 1160, back propagation is performed using the error value to update the parameters of the GUI page encoding model and/or the task processing component using any appropriate techniques. In some implementations, the parameters of the task processing component may be fixed and only the parameters of the GUI page encoding model may be updated.

At step 1170, it is determined whether the training process is complete. If the training process is not complete, then processing continues to step 1120 where another GUI element is selected. If the training process is complete, then processing continues to step 1180.

At step 1180, the trained GUI page encoding model is output so that it may be used for applications of processing GUI pages.

In some implementations, GUI page encoding model 1010 may be trained using more than one task. For example, two training corpuses of GUI pages may be available: a first training corpus of GUI pages with a first set of labels and a second training corpus of GUI pages with a second set of labels. A first task processing component may process a GUI page encoding to predict labels of the first set of labels and a second task processing component may process a GUI page encoding to predict labels of the second set of labels. A GUI page encoding model may be trained using both tasks, such as by alternating training iterations of the two tasks.

After GUI page encoding model 1010 has been trained, it may be used to compute GUI page encodings as depicted in FIG. 10B. GUI page encoding model 1010 may be used for the same task that was used for training or may be used for different tasks.

Figure 12A:
FIG. 12A illustrates an example sequence of GUI pages for training a GUI page encoding model.

In some implementations, GUI page encoding model 1010 may be trained using a training corpus of sequences of GUI pages. FIG. 12A illustrates an example sequence of GUI pages where GUI-1 through GUI-5 indicate GUI pages and A-1 through A-5 indicate actions performed (e.g., clicking on a particular GUI element with a mouse) to transition from one GUI page to the next GUI page.

Figure 12B:
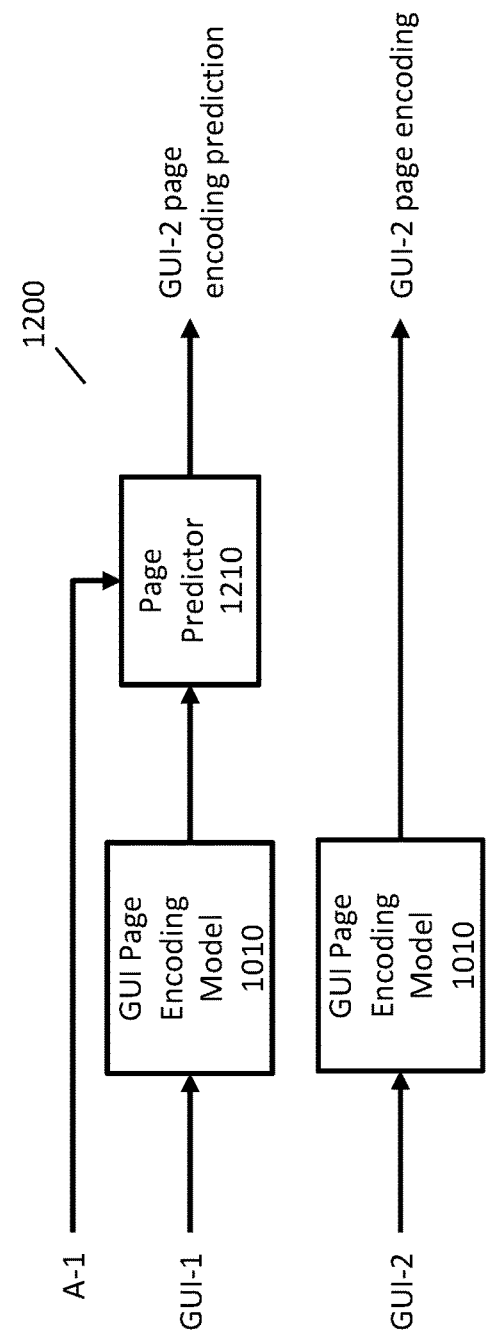
FIG. 12B is an example system for training a GUI page encoding model using sequences of GUI pages.

FIG. 12B is an example system 1200 for training a GUI page encoding model using sequences of GUI pages. FIG. 12B includes GUI page encoding model 1010, as described above, and page predictor component 1210. Page predictor component 1210 includes a mathematical model that processes a first GUI page encoding of a first GUI page to predict a GUI page encoding of a subsequent page. In some implementations, page predictor component 1210 may also process an action performed on the first GUI page (e.g., a mouse click of a particular element) in predicting the GUI page encoding of a subsequent page.

Figure 13:
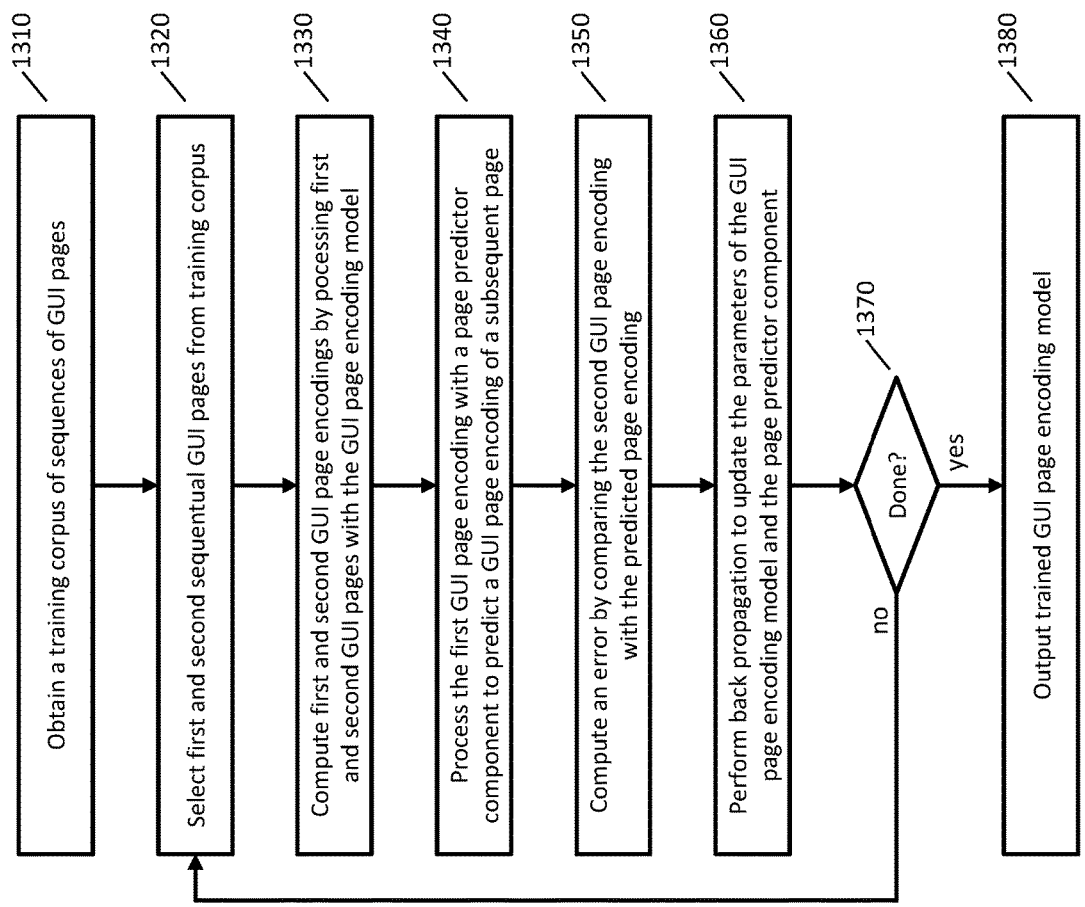
FIG. 13 is a flowchart of an example method for training a GUI page encoding model using sequences of GUI pages.

FIG. 13 is a flowchart of an example method for training a GUI page encoding model using sequences of GUI pages.

At step 1310, a training corpus of sequences of GUI pages is obtained. In some implementations, the sequences may include information about an action that was performed to transition from a GUI page to a subsequent GUI page, such as an element of GUI page that was acted upon and the action that was performed. Other initialization steps may be performed as well, such as initializing the parameters of the GUI page encoding model and/or other models with random values.

At steps 1320 to 1360, the training process iterates over the training corpus to process pairs of sequential GUI pages in the training corpus. For clarity of presentation, the training process is described as iterating over a single pair at a time, but in some implementations, the training process may iterate over batches of pairs of GUI pages.

At step 1320, first and second GUI pages are selected where the second GUI page was subsequent to the first GUI page. The pair of GUI pages may be selected using any appropriate techniques, such as random selection or sequentially iterating over pairs of GUI pages in the training corpus.

At step 1330, first and second GUI page encodings are computed by processing GUI element representations of the first and second GUI pages with the GUI page encoding model. Any appropriate techniques may be used to compute the GUI page encodings, such as any of the techniques described herein.

At step 1340, the first GUI page encoding is processed by a page predictor component to predict a GUI page encoding of a GUI page subsequent to the first GUI page. The GUI page predictor component may be implemented using any appropriate mathematical model, such as a neural network (e.g., multi-layer perceptron, convolutional neural network, or recurrent neural network) or a support vector machine.

In some implementations, the page predictor component may also process a representation of the action that was performed to transition from the first GUI page to the second GUI page. For example, the GUI element that was acted upon may be represented as a GUI element embedding and the action that was performed may be represented as a one-hot vector (of the length of possible actions, such as click, double click, right click, text entry etc.).

At step 1350, an error value is computed for the prediction by comparing the second GUI page encoding with the predicted GUI page encoding. Any appropriate techniques may be used to compute the error value. In some implementations, the error value may be computed as a distance or similarity (e.g., a mean-squared error, cosine similarity, or inner product) between the second GUI page encoding with the predicted GUI page encoding.

At step 1360, back propagation is performed using the error value to update the parameters of the GUI page encoding model and/or the page predictor model using any appropriate techniques. In some implementations, the parameters of the page predictor model may be fixed and only the parameters of the GUI page encoding model may be updated.

At step 1370, it is determined whether the training process is complete. If the training process is not complete, then processing continues to step 1320 where another pair of GUI pages are selected. If the training process is complete, then processing continues to step 1380.

At step 1380, the trained GUI page encoding model is output so that it may be used for applications of processing GUI pages.

Figure 14:
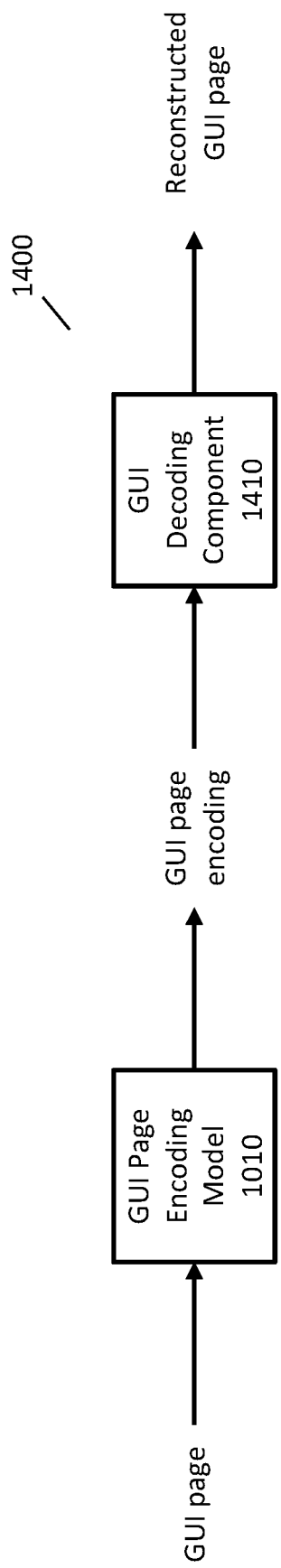
FIG. 14 is an example system for training a GUI page encoding model using an autoencoder.

In some implementations, GUI page encoding model 1010 may be trained using an autoencoder. FIG. 14 is an example system 1400 for training a GUI page encoding model using an autoencoder. In FIG. 14, GUI page encoding model 1010 processes a GUI page to compute a GUI page encoding and then GUI decoding component 1410 processes the GUI page encoding to reconstruct the GUI page from the GUI page encoding.

Figure 15:
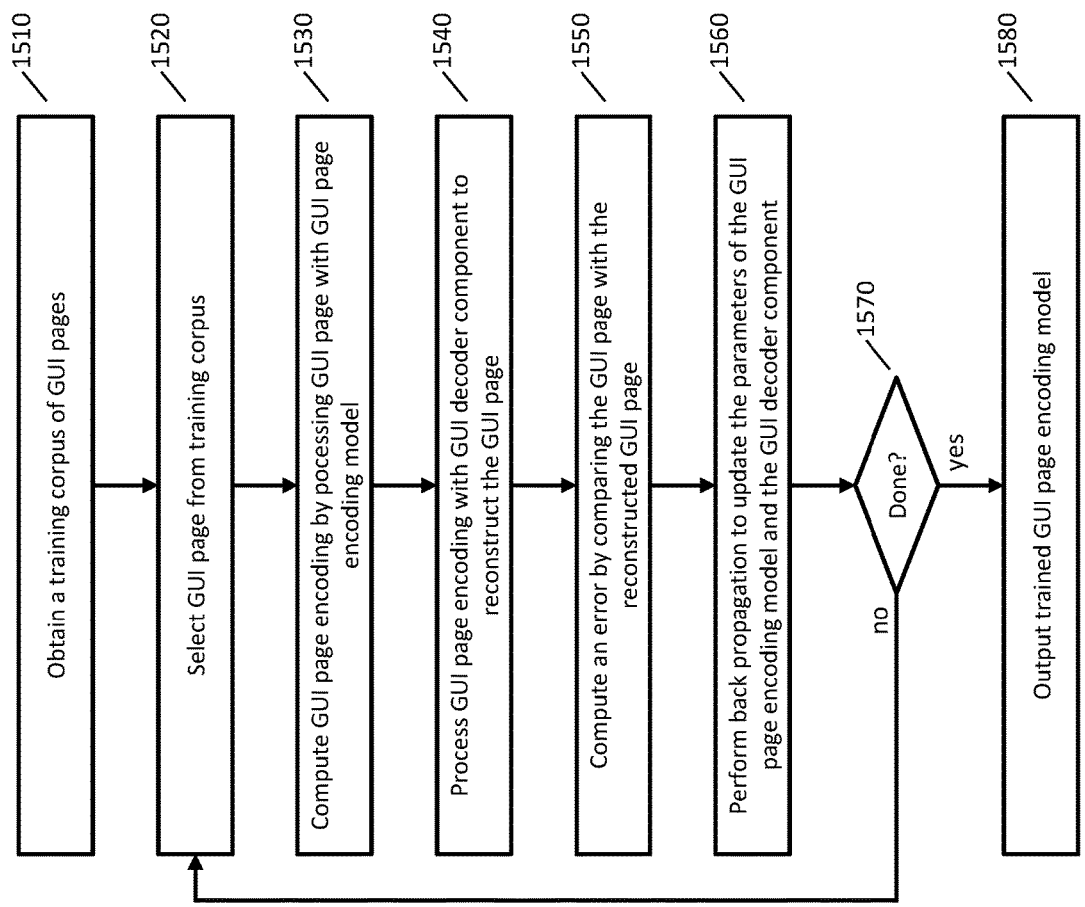
FIG. 15 is a flowchart of an example method for training a GUI page encoding model using an autoencoder.

FIG. 15 is a flowchart of an example method for training a GUI page encoding model using an autoencoder.

At step 1510, a training corpus of GUI pages is obtained. The training corpus may be obtained in any appropriate manner. Other initialization steps may be performed as well, such as initializing the parameters of the GUI page encoding model and/or other models with random values.

At steps 1520 to 1560, the training process iterates over the training corpus to process individual GUI pages in the training corpus. For clarity of presentation, the training process is described by iterating over a single GUI page at a time, but in some implementations, the training process may iterate over batches of GUI pages.

At step 1520, a GUI page is selected. The GUI page may be selected using any appropriate techniques, such as random selection or sequentially iterating over GUI pages in the training corpus.

At step 1530, a GUI page encoding is computed by processing GUI element representations of the of GUI page with the GUI page encoding model. Any appropriate techniques may be used to compute the GUI page encoding, such as any of the techniques described herein.

At step 1540, the GUI page encoding is processed by a GUI decoding component to reconstruct the GUI page. The GUI decoding component may include any appropriate mathematical model, such as a neural network (e.g., multi-layer perceptron, convolutional neural network, or recurrent neural network) or a support vector machine.

At step 1550, an error value is computed by comparing the GUI page to the reconstructed GUI page. Any appropriate techniques may be used to compute the error value. In some implementations, the error value may be computed by computing a distance between GUI elements of the GUI page and the reconstructed GUI page. For example, the distance may be computed using GUI element representations or GUI element representations that have been modified to include position information (such as using any of the techniques described above). In some implementations, the error value may be computed using graph alignment metrics where each GUI element in the reconstructed GUI page may be aligned with a closest GUI element from the GUI page. In some implementations, local distance metrics may be used, such as by predicting a GUI element given its children and the reconstruction of the GUI element. Any combination of the above may also be used to compute an error value.

At step 1560, back propagation is performed using the error value to update the parameters of the GUI page encoding model and/or the GUI decoder component using any appropriate techniques.

At step 1570, it is determined whether the training process is complete. If the training process is not complete, then processing continues to step 1520 where another GUI element is selected. If the training process is complete, then processing continues to step 1580.

At step 1580, the trained GUI page encoding model is output so that it may be used for applications of processing GUI pages.

GUI Element Encodings

Above, techniques are described for computing GUI element embeddings for GUI elements, and for computing GUI page encodings for GUI pages. In addition, any of the techniques described above for computing GUI page encodings for GUI pages may also be used to compute GUI element encodings for GUI elements.

In some implementations, a first GUI element encoding for a first GUI element may be computed by sequentially processing GUI elements of the GUI page along the path from the root GUI element (e.g., the <html> element of a web page) to the first GUI element. Any appropriate techniques may be used to process the GUI elements along the path to compute the first GUI element encoding, such as any of the techniques described herein.

In some implementations, the GUI elements along the path may be sequentially processed with a mathematical model that may be referred to as a GUI element encoding model. A GUI element encoding model may include any appropriate mathematical models, such as a neural network (e.g., a recurrent neural network). The output of the mathematical model after processing the GUI elements along the path may be used as the first GUI element encoding for the first GUI element. The mathematical model may process any appropriate representation of the GUI elements along the path, such as one-hot representations of the GUI elements or GUI element embeddings of the GUI elements. A GUI element encoding model may be trained using any appropriate techniques, such as any of the techniques described herein.

GUI page encodings may also be computed using GUI element encodings, instead of or in addition to using GUI element embeddings.

Implementation

Figure 16:
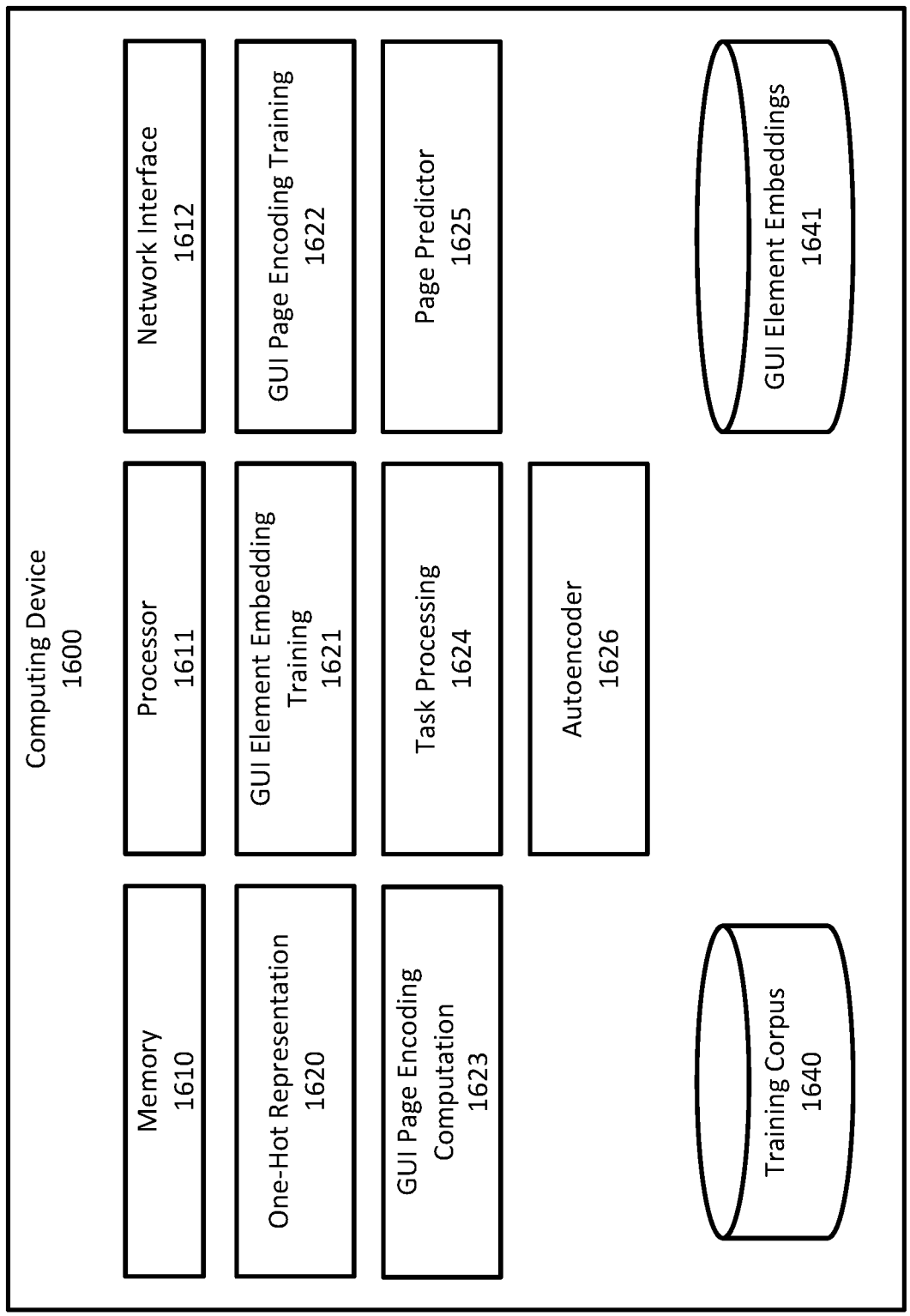
FIG. 16 illustrates components of an exemplary computing device for computing vector space representations of GUI elements and GUI pages.

FIG. 16 illustrates components of one implementation of a computing device 1600 for implementing any of the techniques described above. In FIG. 16, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1600 may include any components typical of a computing device, such as volatile or nonvolatile memory 1610, one or more processors 1611, and one or more network interfaces 1612. Computing device 1600 may also include any input and output components, such as displays, keyboards, and touch screens. Computing device 1600 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1600 may have a one-hot representation component 1620 that may compute one-hot representations of GUI elements using any of the techniques described herein. Computing device 1600 may have a GUI element embedding training component 1621 that may train a set of GUI element embeddings from a training corpus using any of the techniques described herein. Computing device 1600 may have a GUI page encoding training component 1622 that may train a mathematical model for computing GUI page encodings using any of the techniques described herein. Computing device 1600 may have a GUI page encoding computation component 1623 that may compute a GUI page encoding using a mathematical model and using any of the techniques described herein. Computing device 1600 may have a task processing component 1624 that may perform a task relating to a GUI page using any of the techniques described herein. Computing device 1600 may have a page predictor component 1625 that may predict a subsequent GUI page using any of the techniques described herein. Computing device 1600 may have an autoencoder component 1626 that may be used to train a GUI page encoding model using any of the techniques described herein.

Computing device 1600 may include or have access to various data stores. Data stores may use any known storage technology such as files, relational databases, non-relational databases, or any non-transitory computer-readable media. Computing device 1600 may have a training corpus data store 1640 that may store a training corpus for training models for GUI element embeddings and GUI page encodings. Computing device 1600 may have a GUI element embeddings data store 1641 that may be used to store GUI element embeddings for use in an application relating to GUI pages.

It can be seen that the implementations set forth throughout the present disclosure provide technical improvements for rapid and reliable comparison, analysis, adaptation, and/or verification of GUI pages and/or GUI elements. The development of a vector space representation of a GUI, and/or the development of an encoding model for a GUI, facilitate numerous technical improvements over previously known systems and operations. Without limitation to any other aspect of the present disclosure, implementations set forth herein provide for: systematic comparison of GUI pages and/or GUI elements (e.g., to ensure that all functions are present and/or available as planned or relative to a target GUI, to compare a competitive or baseline GUI for functionality, capability, and/or look-and-feel); systematic verification of GUI pages and/or GUI elements (e.g., ensuring that requirements are met, to test changes or updates, and/or to ensure that translation to a different context such as a different user device type, operating system, and/or accessing browser or application maintains expected functionality, capability, and/or look-and-feel); to parse portions of a GUI page and/or GUI element (e.g., to facilitate data capture from operations utilizing the GUI, to compare one or more specific aspects of a GUI, and/or to ensure that planned changes or updates to a GUI are unlikely to result in unexpected consequences or interactions); operations to summarize operational and/or aesthetic aspects of a GUI page and/or GUI element; operations to convert a GUI page and/or GUI element from one context to a different context; and/or operations to analyze a GUI page and/or GUI element to define or verify behavior (e.g., ensuring that different user types interacting with the GUI each have the desired GUI experience, capability to perform desired or authorized functions, and/or inability to access or perform undesired or unauthorized functions). It can be seen that the implementations set forth throughout the present disclosure additionally provide for, where desired, algorithmic interaction with a GUI page and/or GUI element, such as with an application or an application programming interface (API).

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method, comprising:
   obtaining a training corpus comprising a sequence of graphical user interface (GUI) pages; and
      training a GUI page encoding model to compute a GUI page encoding from a GUI page, wherein the GUI page encoding is a vector in a vector space that represents the GUI page, and wherein the training comprises:
      obtaining a first GUI page and a second GUI page from the training corpus,
      computing a first GUI page encoding by processing the first GUI page with the GUI page encoding model, wherein the first GUI page encoding is computed by processing representations of GUI elements of the first GUI page with the GUI page encoding model,
      computing a second GUI page encoding by processing the second GUI page with the GUI page encoding model, computing a predicted GUI page encoding by processing the first GUI page encoding with a page predictor model, wherein the predicted GUI page encoding is not computed using the second GUI page, computing an error value using the predicted GUI page encoding and the second GUI page encoding, and updating parameters of the GUI page encoding model by performing back propagation using the error value.

2. The computer-implemented method of claim 1, wherein the first GUI page and the second GUI page are HTML pages.

3. The computer-implemented method of claim 1, wherein computing the first GUI page encoding comprises:
obtaining GUI element embeddings for GUI elements of the first GUI page; and
processing the GUI element embeddings with the GUI page encoding model.

4. The computer-implemented method of claim 3, wherein the GUI element embeddings are learned by using a first GUI element to predict a neighboring element of the first GUI element.

5. The computer-implemented method of claim 4, comprising determining one-hot representations for the GUI elements.

6. The computer-implemented method of claim 4, wherein the neighboring element is a parent GUI element, a combination of child GUI elements, or a combination of sibling GUI elements.

7. The computer-implemented method of claim 1, wherein the GUI page encoding model computes the first GUI page encoding by iteratively processes GUI elements of the first GUI page using a specified traversal order.

8. The computer-implemented method of claim 1, wherein training the GUI page encoding model comprises iteratively processing batches of GUI pages of the training corpus.

9. A system, comprising:
at least one server computer comprising at least one processor and at least one memory, the at least one server computer configured to:
obtain a training corpus comprising a sequence of graphical user interface (GUI) pages,
obtain a first GUI page and a second GUI page from the training corpus,
compute a first GUI page encoding by processing the first GUI page with a GUI page encoding model, wherein the first GUI page encoding is computed by processing representations of GUI elements of the first GUI page with the GUI page encoding model,
compute a second GUI page encoding by processing the second GUI page with the GUI page encoding model,
compute a predicted GUI page encoding by processing the first GUI page encoding with a page predictor model, wherein the predicted GUI page encoding is not computed using the second GUI page,
compute an error value using the predicted GUI page encoding and the second GUI page encoding, and
update parameters of the GUI page encoding model by performing back propagation using the error value,
wherein a GUI page encoding is a vector in a vector space that represents a GUI page.

10. The system of claim 9, wherein the at least one server computer is configured to:
obtain an action corresponding to a transition from the first GUI page to the second GUI page; and
compute the predicted GUI page encoding using the action.

11. The system of claim 10, wherein the action corresponds to a mouse click of a first GUI element of the first GUI page.

12. The system of claim 9, wherein the at least one server computer is configured to update parameters of the page predictor model by performing back propagation using the error value.

13. The system of claim 9, wherein the GUI page encoding model computes a weighted sum of GUI element representations of GUI elements of a GUI page.

14. The system of claim 9, wherein the GUI page encoding model computes a weight for a GUI element by processing a GUI element representation of the GUI element with a weight computation neural network.

15. The system of claim 14, wherein the weight computation neural network comprises a multi-layer perceptron.

16. The system of claim 9, wherein the first GUI page includes hashed text to conceal sensitive information.

17. One or more non-transitory, computer-readable media comprising computer-executable instructions that, when executed, cause at least one processor to perform actions comprising:
obtaining a training corpus comprising a sequence of graphical user interface (GUI) pages;
obtaining a first GUI page and a second GUI page from the training corpus,
computing a first GUI page encoding by processing the first GUI page with a GUI page encoding model, wherein the first GUI page encoding is computed by processing representations of GUI elements of the first GUI page with the GUI page encoding model,
computing a second GUI page encoding by processing the second GUI page with the GUI page encoding model,
computing a predicted GUI page encoding by processing the first GUI page encoding with a page predictor model, wherein the predicted GUI page encoding is not computed using the second GUI page,
computing an error value using the predicted GUI page encoding and the second GUI page encoding, and
updating parameters of the GUI page encoding model by performing back propagation using the error value,
wherein a GUI page encoding is a vector in a vector space that represents a GUI page.

18. The one or more non-transitory, computer-readable media of claim 17, wherein the page predictor model comprises a multi-layer perceptron.

19. The one or more non-transitory, computer-readable media of claim 17, wherein the GUI page encoding model processes GUI elements with a recurrent neural network.

20. The one or more non-transitory, computer-readable media of claim 17, wherein computing the first GUI page encoding comprises processing a position encoding of GUI elements of the first GUI page.

* * * * *